(12) United States Patent
Hayes et al.

(10) Patent No.: US 10,059,268 B2
(45) Date of Patent: Aug. 28, 2018

(54) DRIVE SYSTEM FOR AN AUTOMATIC STEP

(71) Applicant: Rock-Slide Engineering, LLC, North Logan, UT (US)

(72) Inventors: Mark David Hayes, Smithfield, UT (US); Justin Sampson, North Logan, UT (US); Dave Luman, Logan, UT (US)

(73) Assignee: CURT MANUFACTURING, LLC, Eau Claire, WI (US)

( * ) Notice: Subject to any disclaimer, the term of this patent is extended or adjusted under 35 U.S.C. 154(b) by 0 days.

(21) Appl. No.: 15/636,963

(22) Filed: Jun. 29, 2017

(65) Prior Publication Data

US 2018/0009385 A1    Jan. 11, 2018

Related U.S. Application Data

(60) Provisional application No. 62/359,553, filed on Jul. 7, 2016.

(51) Int. Cl.
| | | |
|---|---|---|
| *B60R 3/02* | (2006.01) | |
| *F16C 3/22* | (2006.01) | |
| *F16C 3/04* | (2006.01) | |
| *F16C 11/04* | (2006.01) | |

(52) U.S. Cl.
CPC ............... *B60R 3/02* (2013.01); *F16C 3/22* (2013.01); *F16C 3/04* (2013.01); *F16C 11/045* (2013.01); *F16C 2326/01* (2013.01); *F16C 2326/20* (2013.01)

(58) Field of Classification Search
CPC ..................................................... B60R 3/02

USPC ............................................... 280/163, 166
See application file for complete search history.

(56) References Cited

U.S. PATENT DOCUMENTS

| | | | | |
|---|---|---|---|---|
| 4,623,160 | A | | 11/1986 | Trudell |
| 4,813,293 | A | * | 3/1989 | Fink .................... E05F 15/50 277/402 |
| 5,375,864 | A | | 12/1994 | McDaniel |
| 5,547,040 | A | | 8/1996 | Hanser et al. |
| 5,842,709 | A | * | 12/1998 | Maccabee ................ B60R 3/02 182/127 |
| 5,957,237 | A | * | 9/1999 | Tigner .................... B60R 3/02 182/127 |
| 6,135,472 | A | * | 10/2000 | Wilson .................. B60R 3/002 280/164.1 |
| 6,149,172 | A | * | 11/2000 | Pascoe .................... B60R 3/02 280/163 |

(Continued)

*Primary Examiner* — Jeffrey J Restifo
(74) *Attorney, Agent, or Firm* — Preston P. Frischknecht; Project CIP

(57) ABSTRACT

A drive system for an automatic step including an actuator for moving an automatic step, a crank arm pivotally coupled to the actuator and pivotable about a central shaft, and a first link pivotally coupled to the crank arm, the first link having first and second ends. The linkage comprises one or more force mitigation mechanisms capable of reducing forces eccentric to the actuator. A first force mitigation mechanism engages when the step is deployed or nearly deployed by aligning the central shaft with the first and second ends of the first link along a first axis to generally place eccentric forces originating from the step against the central shaft of the crank arm instead of directly engaging the actuator.

13 Claims, 7 Drawing Sheets

(56) References Cited

U.S. PATENT DOCUMENTS

| | | | | |
|---|---|---|---|---|
| 6,325,397 B1* | 12/2001 | Pascoe | | B60R 3/02 280/163 |
| 6,641,158 B2* | 11/2003 | Leitner | | B60R 3/002 105/443 |
| 6,834,875 B2* | 12/2004 | Leitner | | B60R 3/02 105/447 |
| 6,926,295 B2* | 8/2005 | Berkebile | | B60R 3/002 280/163 |
| 6,942,233 B2* | 9/2005 | Leitner | | B60R 3/002 105/447 |
| 6,955,370 B2* | 10/2005 | Fabiano | | B60R 3/002 280/163 |
| 7,086,656 B2* | 8/2006 | Kolpasky | | B60R 3/002 280/164.1 |
| 7,118,120 B2* | 10/2006 | Lee | | B60R 3/002 280/166 |
| 7,163,221 B2* | 1/2007 | Leitner | | B60R 3/02 105/444 |
| 7,287,771 B2* | 10/2007 | Lee | | B60R 3/002 280/163 |
| 7,318,596 B2* | 1/2008 | Scheuring, III | | B60R 3/002 280/163 |
| 7,367,574 B2* | 5/2008 | Leitner | | B60R 3/02 280/163 |
| 7,413,205 B2* | 8/2008 | Watson | | B60R 3/02 280/163 |
| 7,441,790 B2* | 10/2008 | Lechkun | | B60R 3/02 280/163 |
| 7,469,916 B2* | 12/2008 | Watson | | B60R 3/02 280/163 |
| 7,487,986 B2* | 2/2009 | Leitner | | B60R 3/02 280/163 |
| 7,513,520 B2* | 4/2009 | Okuyama | | B60R 3/02 280/166 |
| 7,513,565 B2* | 4/2009 | Watson | | B60R 3/002 280/163 |
| 7,584,975 B2* | 9/2009 | Leitner | | B60R 3/02 280/163 |
| 7,594,672 B2* | 9/2009 | Piotrowski | | B60R 3/002 280/163 |
| 7,677,584 B2* | 3/2010 | Raley | | B60R 3/02 182/127 |
| 7,712,755 B2* | 5/2010 | Yang | | B60R 3/02 280/163 |
| 7,841,609 B2* | 11/2010 | Okada | | B60R 3/02 280/163 |
| 7,857,337 B2* | 12/2010 | Ferguson | | B60R 3/02 182/127 |
| 7,900,944 B2* | 3/2011 | Watson | | B60R 3/02 280/166 |
| 8,042,821 B2* | 10/2011 | Yang | | B60R 3/02 280/163 |
| 8,052,162 B2* | 11/2011 | Yang | | B60R 3/02 280/163 |
| 8,056,913 B2 | 11/2011 | Kuntze et al. | | |
| 8,070,173 B2* | 12/2011 | Watson | | B60R 3/02 280/163 |
| 8,136,826 B2* | 3/2012 | Watson | | B60R 3/02 280/163 |
| 8,251,178 B2 | 8/2012 | Krobot | | |
| 8,342,551 B2* | 1/2013 | Watson | | B60R 3/02 280/163 |
| 8,622,408 B2* | 1/2014 | Ishida | | B60J 5/06 280/163 |
| 8,668,217 B2 | 3/2014 | Ziaylek et al. | | |
| 8,714,575 B2* | 5/2014 | Watson | | B60R 3/02 280/166 |
| 8,833,781 B2* | 9/2014 | Hayes | | B60R 3/02 280/163 |
| 9,010,473 B1* | 4/2015 | Rasmussen | | B60R 3/02 180/166 |
| 9,073,486 B1* | 7/2015 | Meszaros | | B60R 3/002 |
| 9,120,426 B1* | 9/2015 | Huebner | | B60R 3/02 |
| 9,174,581 B2* | 11/2015 | Cha | | B60R 3/02 |
| 9,522,634 B1* | 12/2016 | Smith | | B60R 3/02 |
| 9,550,458 B2* | 1/2017 | Smith | | B60R 3/02 |
| 9,586,527 B1* | 3/2017 | Salter | | B60R 3/02 |
| 9,649,983 B2* | 5/2017 | Watson | | B60R 3/02 |
| 9,656,609 B2* | 5/2017 | Du | | B60R 3/02 |
| 9,669,767 B2* | 6/2017 | Du | | B60R 3/02 |
| 9,688,205 B2* | 6/2017 | Du | | B60R 3/02 |
| 9,771,024 B2* | 9/2017 | Hayes | | B60R 3/02 |
| 9,776,571 B2* | 10/2017 | Fortin | | B60R 3/02 |
| 2005/0179226 A1* | 8/2005 | Kolpasky | | B60R 3/002 280/163 |
| 2008/0116653 A1* | 5/2008 | Piotrowski | | B60R 3/002 280/166 |
| 2008/0238019 A1* | 10/2008 | Okada | | B61D 23/025 280/166 |
| 2010/0044993 A1* | 2/2010 | Watson | | B60R 3/002 280/166 |
| 2011/0233889 A1* | 9/2011 | Watson | | B60R 3/02 280/166 |

* cited by examiner

DRIVE SYSTEM FOR AN AUTOMATIC STEP

RELATED APPLICATIONS

This application claims priority to U.S. Provisional Application No. 62/359,553, filed on Jul. 7, 2016.

BACKGROUND OF THE INVENTION

As described elsewhere in the prior art, robust rocker guards with automatic steps have grown in popularity—specifically in connection with off-road driving—as accessories for Jeeps, SUVs, rock crawlers, trucks and other off-road vehicles. These systems face significant abuse and wear as a function of their typical use. Even beyond environmental conditions, users themselves can place significant strain on the underlying mechanisms—particularly the actuator motors of such automatic steps—by placing their weight on the step in any manner that acts against or forces the motor. Forcing an actuator motor against its natural motion may result in overwhelming and/or shearing force, thereby increasing the likelihood of malfunction and/or wear that decreases product life. Accordingly, in order to create a more robust rocker guard with automatic step, a drive system is needed with features that dissipate errant- or counter-forces against the step actuator motor.

SUMMARY OF THE INVENTION

In accordance with the above, a drive system for an automatic step is provided. The system has one or more force mitigation mechanisms capable of reducing counter-force to an automatic step actuator. Some embodiments include a rotary actuator for moving an automatic step, a crank arm pivotally coupled to the actuator and pivotable about a central shaft, and a first link pivotally coupled to the crank arm, the first link having first and second ends. A first force mitigation mechanism engages when the step is deployed or nearly deployed by aligning the central shaft with the first and second ends of the first link along a first axis to generally place counter forces from the step against the central shaft of the crank arm instead of the actuator. A second force mitigation mechanism allows the crank arm to yield without forcing the actuator by using a tolerance ring and/or clutch adjacent to the central shaft to.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through the use of the accompanying drawings in which.

DETAILED DESCRIPTION OF THE ILLUSTRATED EMBODIMENT

Figure 1:
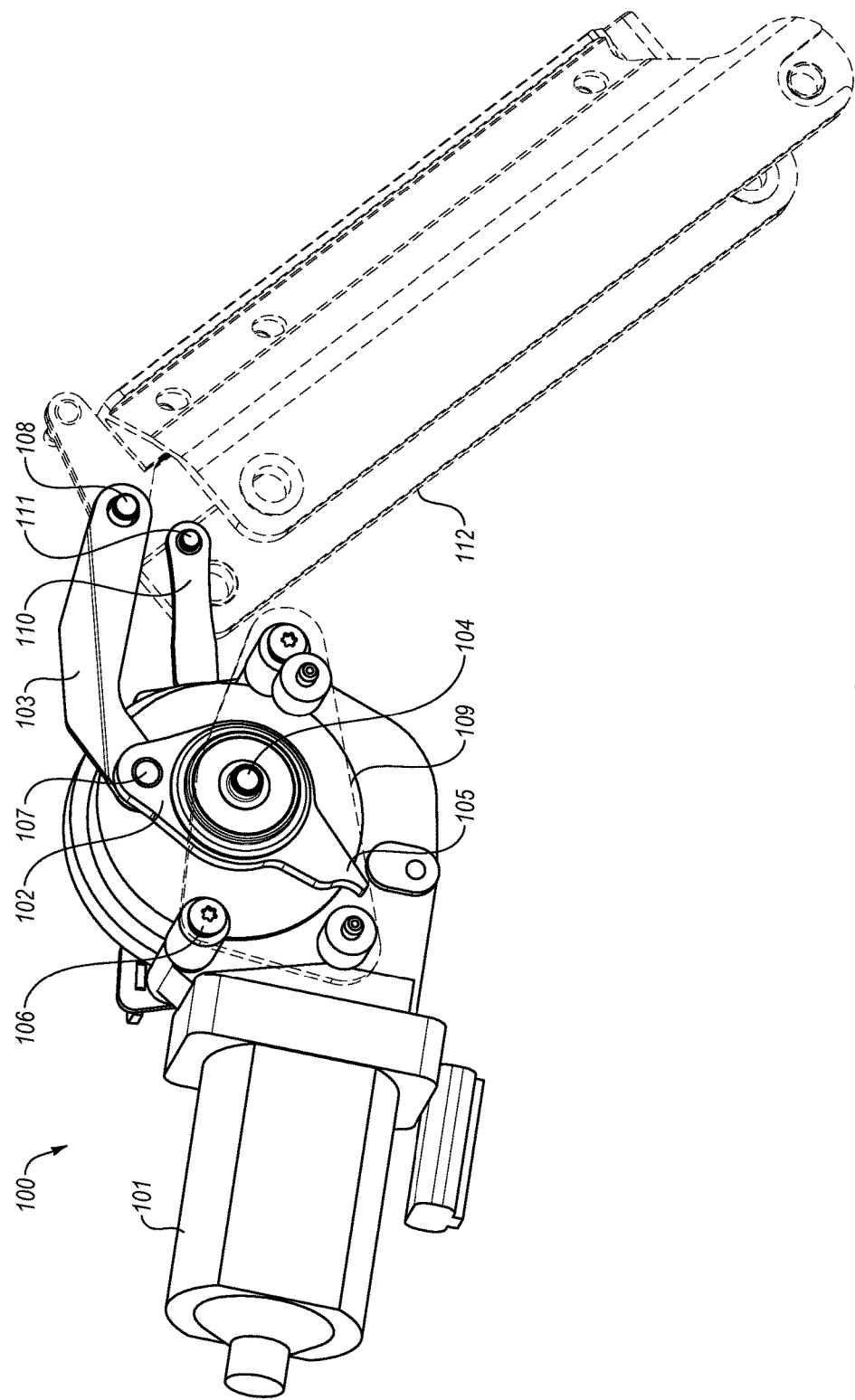
FIG. 1 is a side perspective view of one embodiment of the drive system.

The present invention in its various embodiments, some of which are depicted in the figures herein, is a drive system for an automatic step. FIG. 1 depicts one embodiment of the drive system 100. In various embodiments, drive system 100 may include a rotary actuator 101 coupled to a crank arm 102, that, in turn, is coupled to a first link 103 for moving an automatic step, through one or more step portions. As shown by the embodiment of FIG. 1, the linkage moves a first support leg portion 112. In certain embodiments, the movement of the crank arm 102 and first coupler link 103—together with other ancillary movements described in more detail below—is configured to occur within the interior of an encased rocker guard body. For exemplary purposes only, one such compatible design within which the drive system 100 may function is set forth in U.S. Pat. No. 8,833,781 and/or U.S. patent application Ser. No. 15/178,467, both of which are incorporated herein by reference.

In various embodiments, the rotary actuator 101 is distal from the step (not shown), but placement may vary. The crank arm 102 is adjacent to the actuator 101 and pivots about a central shaft 104 positioned perpendicular to the actuator 101. The crank arm 102 has one or more ends 105 for bounding the range of movement of the crank arm 102 together with one or more stops 106 that engage the one or more ends 105 of the crank arm 102 at a certain position within its range of travel. See also FIGS. 3a-3c. The first link 103 is adjacent and pivotally coupled to the crank arm 102.

In operation, the first link 103 is coupled to the crank arm 102 at a first end 107 and to an automatic step portion, e.g., a first support leg portion 112, at a second end 108. In various embodiments the first link 103 may incorporate one or more obtuse or other angles between the first 107 and/or second 108 ends in order to provide desired positioning and movement of the linkage or portions of the linkage throughout the system's 100 various operations, described in more detail below.

Figure 2:
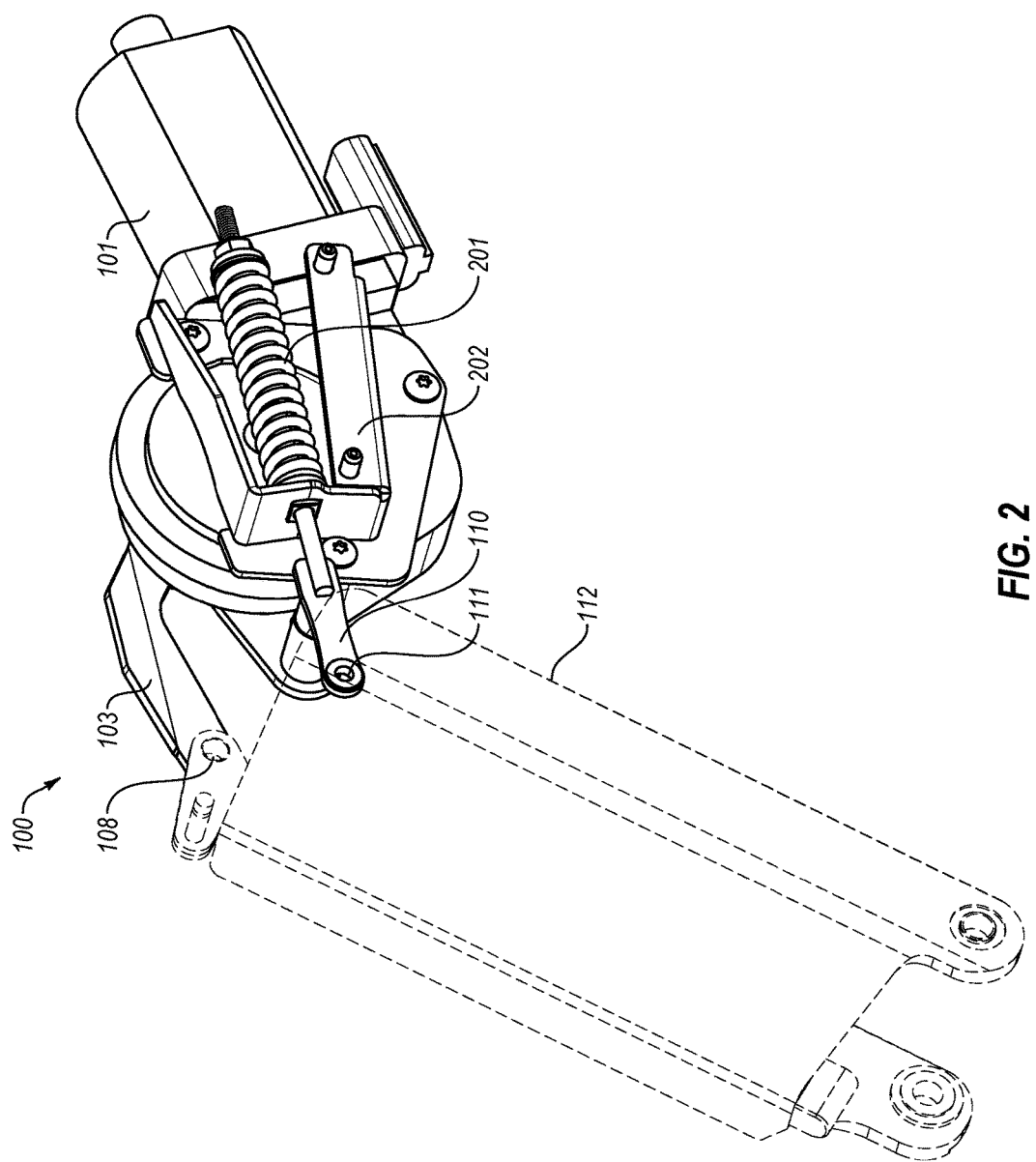
FIG. 2 is an opposite, side perspective view of one embodiment of the drive system.

Referring now to FIG. 2, various embodiments of the drive 100 may also incorporate a counter-balance spring 201, coupled to a step portion 112 via a second link 110. The counter-balance spring 201 compensates for the weight of the step against gravity so that the actuator 101 requires less torque to lift a step from a deployed position, essentially acting as a spring assist for the system 100. In some embodiments, the counter-balance spring 201 is pre-loaded to require nearly as much torque from the actuator to deploy a step as it does to nest it. This results in substantially balanced forces required to deploy and nest the automatic step. Bracket 202 holds the counter-balance spring 201 in position.

Figure 3:
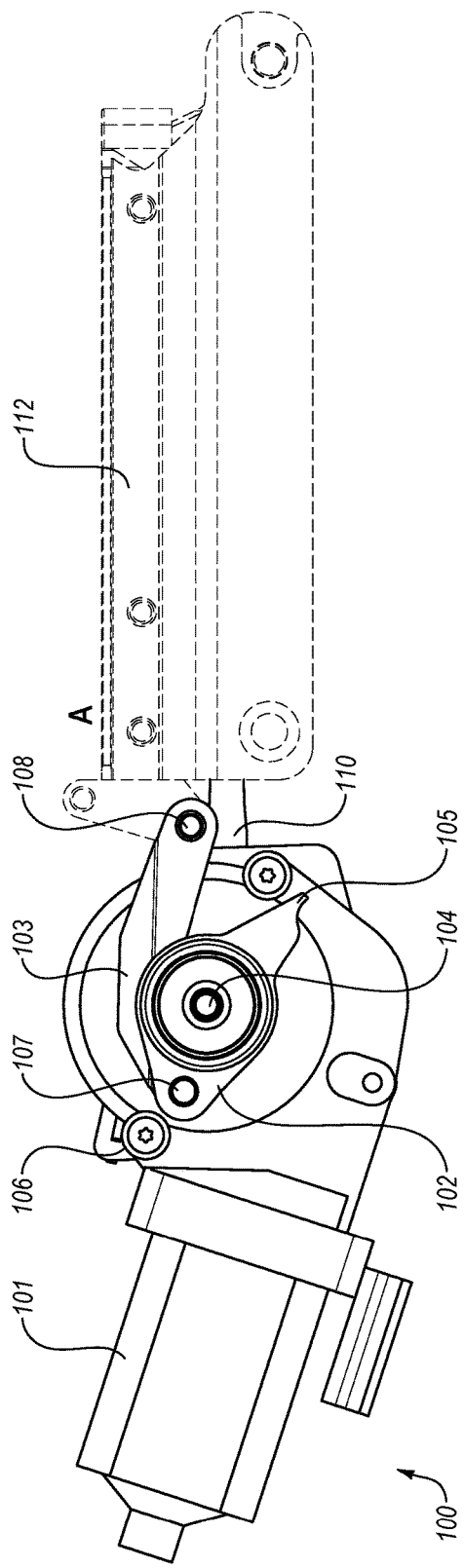
FIG. 3 is a side view of one embodiment of the drive system with automatic step portion in a nested position.
Figure 4:
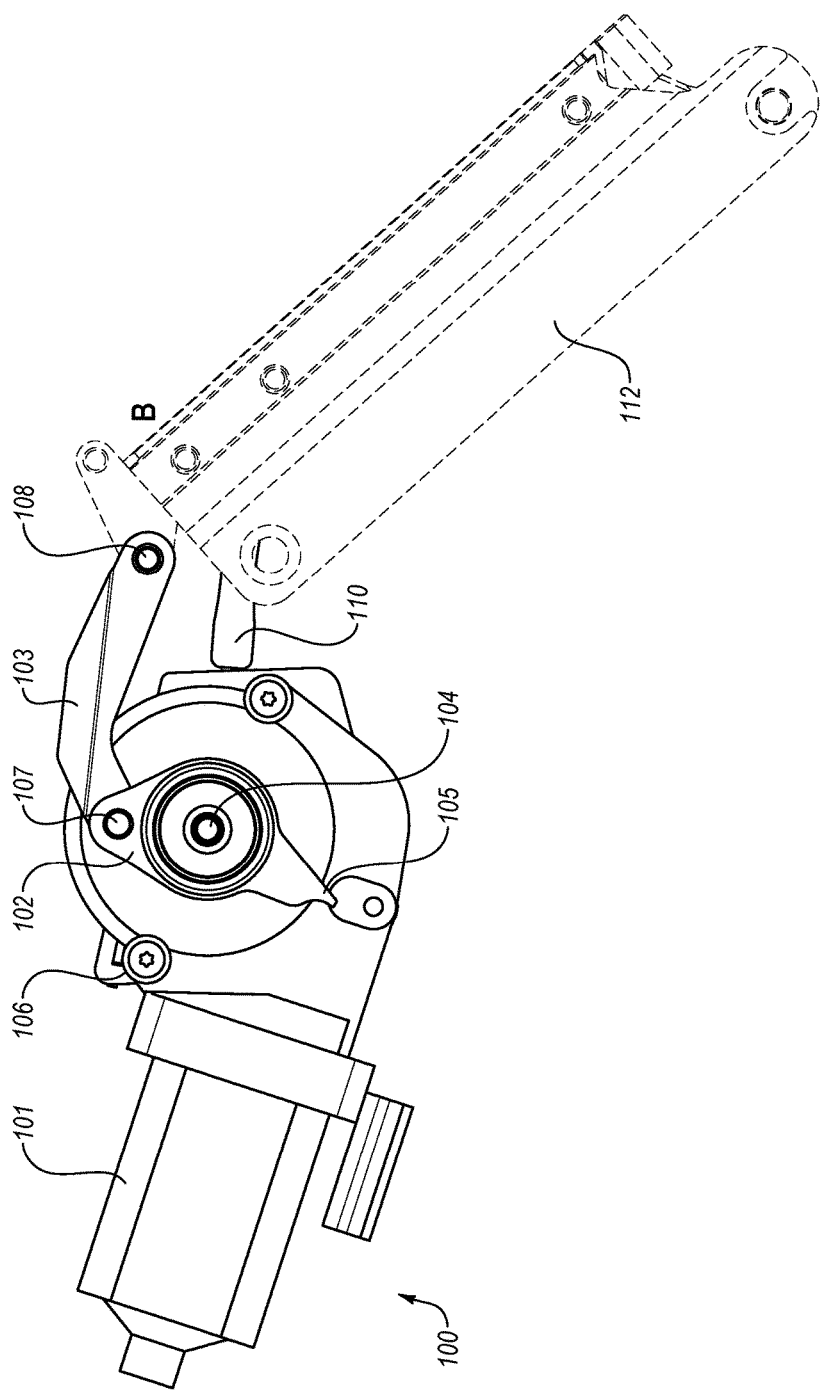
FIG. 4 is a side view of one embodiment of the drive system with automatic step portion in an intermediate, or partly deployed position.
Figure 5:
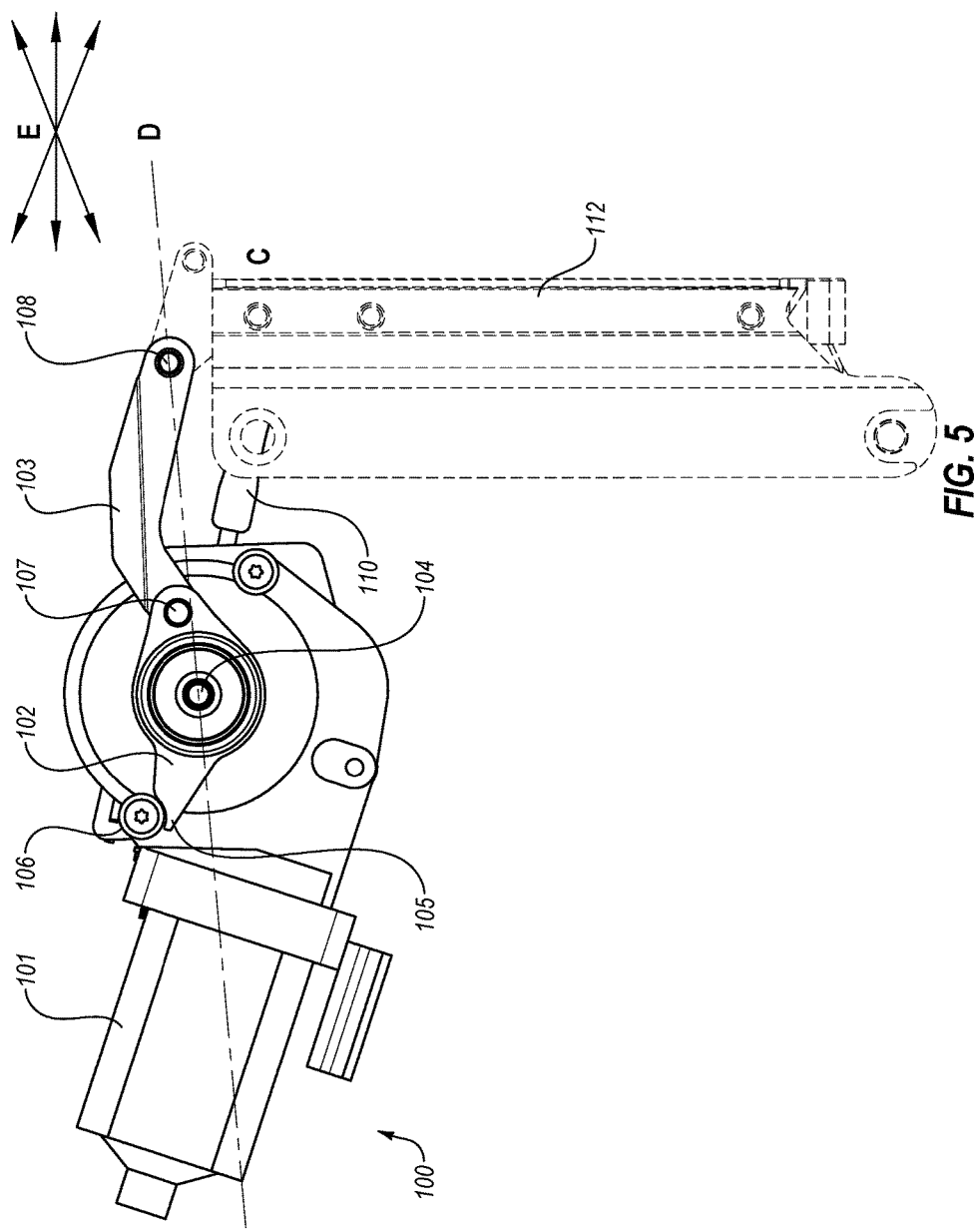
FIG. 5 is a side view of one embodiment of the drive system with automatic step portion in a fully deployed position.

Referring more specifically to FIGS. 3 through 5, the system's 100 movements and operations are described in more detail. When the system 100 is in operation and connected to a step assembly, the first link 103 is directly or indirectly coupled to the step portion 112. The system 100 is operable such that engagement of the rotary actuator 101 causes the step portion 112 to retract to a nested position A, or deploy to a deployed position C. Various embodiments may have one or more interim positions, e.g., B.

Turning now to FIG. 5, eccentric forces E (drawing representative only), including, but not limited to, extra-actuator-initiated and counter forces, may be generated by any number of means, e.g., a user stepping on the step while the actuator is engaged and moving the step between positions. When these eccentric forces E occur in other automatic step designs, the actuator motor 101 largely absorbs the forces E, increasing the likelihood that the motor wears or breaks in the short term and/or that the longevity of the system is decreased over the long term. In contrast, the drive system 100 of the present invention is capable of displacing eccentric forces E with respect to the motor to mitigate such destructive forces, and does so through one or more mechanisms.

First, the drive system 100 has a first force mitigation mechanism comprised of a structure capable of aligning certain portions and/or axes of the system's 100 components, including pivot points, along a first axis D, wherein first axis D is roughly parallel to eccentric forces E. More particularly, the first force mitigation mechanism aligns the central shaft 104 with the first link's 103 first 107 and second 108 ends such that eccentric forces E are generally diverted to and placed against the central shaft 104 as opposed to being transferred to and engaging the actuator motor 101. To further facilitate this, the central shaft 104 may be externally supported by brackets 109 (see FIG. 1) so that eccentric forces E are not transmitted to the actuator motor. In preferred embodiments, this first force mitigation mechanism avoids strain on the actuator motor when the step is at, or nearly at, the deployed position C. Significantly, it is at, or nearly at, this deployed position C that a user is most likely to generate system-shortening effects via missteps, premature steps, or late steps.

Figure 6:
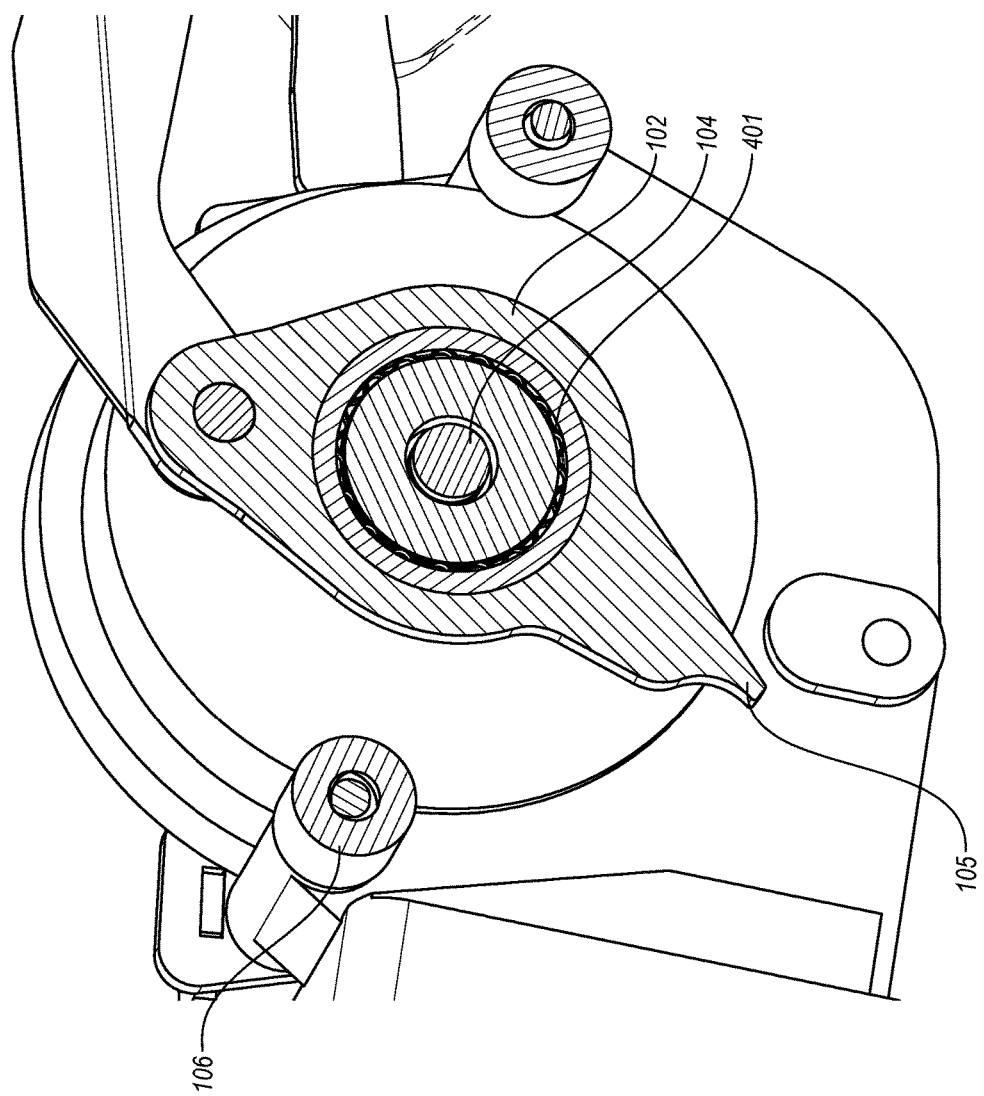
FIG. 6 is a closeup partial cross section of the crank arm and central shaft portion of one embodiment of the drive system.

Second, and briefly referring to FIG. 6, the system 100 has a second force mitigation mechanism comprised of a tolerance ring and/or clutch 401 that allows the crank arm 102 to yield, move, and or rotate along its axis to a certain degree with respect to the central shaft 104 without forcing the actuator motor.

Another feature of the system 100 allows an automatic step to travel on a relatively slower curve as the step approaches or leaves from either nested position A or deployed position C. The relatively slower curve of travel is a result of the angles and curvature created from operation of the crank arm 102, first link 103, and step couplings.

Figure 7:
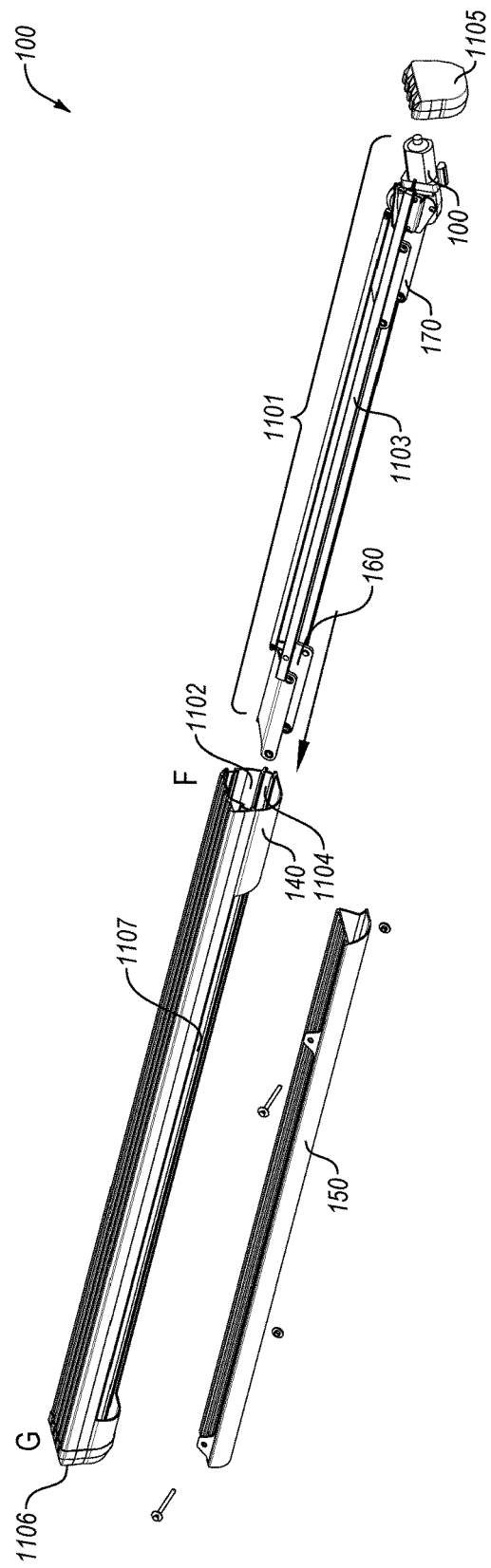
FIG. 7 is a perspective, partially exploded view of the drive system as part of an automatic step cartridge system for placement within a body portion of an automatic step with rocker guard for a vehicle.

Referring now to FIG. 7, shown is one embodiment of the system 100 connected to a cartridge 1101, and insertable as an automatic step component with other components, into a robust rocker guard body 140. The body 140 for an automatic step is shown with an interior volume 1102 operable to receive a cartridge 1101, including the system 100 for moving the step 150 and one or more support legs 160, 170 for extending the step 150 away from the body 140 when the step 150 is coupled to the one or more support legs 160, 170. This particular embodiment improves the economy of assembly by providing many of the internal workings of the automatic step in a single assembly piece (i.e. 1101) that may be inserted into an end A of the body 140, with minimal additional assembly required in order to achieve a fully functional and attached, automatic step.

The cartridge 1101 may be indexed and/or affixed to the body 140 through one or more rails 1103, 1204 that correspond to body tracks 1203, 1202. Once placed within the body 140, one or more support legs 160, 170 may be pulled from an automatic step aperture 1107 and coupled with the step 150 to further assemble the automatic step. The body 140, when assembled with the step 150 in the retracted position, and one or more ends 1105, 1106, is substantially closed on all sides to create a well-encased, outer barrier of protection against elements and obstructions.

Thus configured, embodiments of the present invention provide a drive system for an automatic step that displaces eccentric forces against the actuator motor by using a rotary actuator, a first force mitigation mechanism that aligns a central shaft with a first link's ends such that eccentric forces from a step are generally diverted to and placed against the central shaft, and a second force mitigation mechanism comprised of a tolerance ring and/or clutch that allows the crank arm to yield, move, and or rotate along its axis to a certain degree with respect to the central shaft without engaging the actuator motor. With the above structure, actuator motor wear and tear is reduced with a more robust system that protects the motor against opposing forces.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A drive system for an automatic step comprising:
an actuator for moving an automatic step between nested and deployed positions;
a crank arm coupled to the actuator and pivotable about a central shaft; and
a first link pivotally coupled to the crank arm;
wherein the crank arm, first link, and central shaft form a first force mitigation mechanism for reducing eccentric force to the actuator by directing the force substantially perpendicular to the central shaft.

2. The drive system of claim 1, wherein the actuator includes a rotary actuator.

3. The drive system of claim 1, the first link further having first and second ends that substantially align with the central shaft along a first axis to direct eccentric force to the central shaft.

4. The drive system of claim 1, further having a second force mitigation mechanism comprised of a clutch for reducing eccentric force to the actuator.

5. The drive system of claim 1, wherein the drive system is attached to a cartridge that is capable of being inserted into a body portion of a rocker guard for a vehicle.

6. The drive system of claim 5, the body portion capable of encasing the drive system.

7. A drive system for an automatic step, comprised of:
an actuator for moving an automatic step between nested and deployed positions;
a crank arm coupled to the actuator and pivotable about a central shaft;
a first link pivotally coupled to the crank arm, the first link having first and second ends; and
a first force mitigation mechanism capable of substantially aligning the central shaft with the first and second ends of the first link along a first axis for directing eccentric force to the central shaft.

8. The drive system of claim 7, further comprising a counterbalance spring to assist in lifting the step from a deployed position.

9. The drive system of claim 7, the drive system further attached to a cartridge that is capable of being inserted into a body portion of a rocker guard for a vehicle.

10. The drive system of claim 9, the body portion capable of encasing the drive system.

11. The drive system of claim 9, the cartridge further comprising one or more support legs and a first step.

12. The drive system of claim 9, the cartridge having at least one end and the drive system located at the at least one end.

13. The drive system of claim 7, further comprising a second force mitigation mechanism comprised of a clutch adjacent to the central shaft that allows the crank arm to yield without engaging the actuator.

* * * * *